(12) United States Patent
Chen et al.

(10) Patent No.: US 11,061,835 B1
(45) Date of Patent: Jul. 13, 2021

(54) SENSITIVITY MATRIX FOR SYSTEM LOAD INDICATION AND OVERLOAD PREVENTION

(71) Applicant: EMC IP Holding Company LLC, Hopkinton, MA (US)

(72) Inventors: Xiangping Chen, Sherborn, MA (US); Anton Kucherov, Dudley, MA (US); Svetlana Kronrod, Concord, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/788,461

(22) Filed: Feb. 12, 2020

(51) Int. Cl.
  *G06F 13/16* (2006.01)
  *G06F 13/18* (2006.01)
  *G06F 9/50* (2006.01)

(52) U.S. Cl.
  CPC ........ *G06F 13/1668* (2013.01); *G06F 9/5077* (2013.01); *G06F 13/18* (2013.01)

(58) Field of Classification Search
  CPC ..... G06F 13/1688; G06F 18/18; G06F 9/5077
  See application file for complete search history.

(56) References Cited

U.S. PATENT DOCUMENTS

| | | | |
|---|---|---|---|
| 7,475,124 B2 | 1/2009 | Jiang et al. | |
| 8,327,103 B1 | 12/2012 | Can et al. | |
| 8,380,928 B1 | 2/2013 | Chen et al. | |
| 8,429,346 B1 | 4/2013 | Chen et al. | |
| 8,515,911 B1 | 8/2013 | Zhou et al. | |
| 8,539,148 B1 | 9/2013 | Chen et al. | |
| 8,566,483 B1 | 10/2013 | Chen et al. | |
| 8,583,607 B1 | 11/2013 | Chen et al. | |
| 8,683,153 B1 | 3/2014 | Long et al. | |
| 8,712,976 B1 | 4/2014 | Chen et al. | |
| 8,775,388 B1 | 7/2014 | Chen et al. | |
| 8,782,324 B1 | 7/2014 | Chen et al. | |
| 8,799,601 B1 | 8/2014 | Chen et al. | |
| 8,909,887 B1 | 12/2014 | Armangau et al. | |
| 8,930,746 B1 | 1/2015 | Chen et al. | |
| 8,954,699 B1 | 2/2015 | Chen et al. | |

(Continued)

OTHER PUBLICATIONS

U.S. Appl. No. 15/499,943, filed Apr. 28, 2017, Kucherov et al.

(Continued)

*Primary Examiner* — Henry Tsai
*Assistant Examiner* — Christopher A Daley
(74) *Attorney, Agent, or Firm* — Daly, Crowley, Mofford & Durkee, LLP

(57) ABSTRACT

An aspect of performing input/output (IO) flow control in a storage system includes receiving an IO latency factor for each IO of a plurality of IOs in a workload. The IO latency factor specifies a priority level. An aspect also includes receiving a component latency factor, with respect to each of the IOs in the workload, for each component of a plurality of components in the storage system. The component latency factor indicates a degree to which the component is considered in assessing the workload. An aspect also includes applying, during processing of the workload, the IO latency factor and the component latency factor to each of the corresponding IOs; and determining an effective average latency of the plurality of IOs in the workload as a function of the applied IO latency factors and the applied component latency factors.

20 Claims, 8 Drawing Sheets

(56) References Cited

U.S. PATENT DOCUMENTS

| | | | |
|---|---|---|---|
| 8,977,812 | B1 | 3/2015 | Chen et al. |
| 9,104,326 | B2 | 8/2015 | Frank et al. |
| 9,152,336 | B1 | 10/2015 | Chen et al. |
| 9,208,162 | B1 | 12/2015 | Hallak et al. |
| 9,286,003 | B1 | 3/2016 | Hallak et al. |
| 9,304,889 | B1 | 4/2016 | Chen et al. |
| 9,317,435 | B1* | 4/2016 | Bairavasundaram ........................ G06F 12/0848 |
| 9,355,112 | B1 | 5/2016 | Armangau et al. |
| 9,384,206 | B1 | 7/2016 | Bono et al. |
| 9,395,937 | B1 | 7/2016 | Si et al. |
| 9,449,011 | B1 | 9/2016 | Chen et al. |
| 9,459,809 | B1 | 10/2016 | Chen et al. |
| 9,460,102 | B1 | 10/2016 | Bono et al. |
| 9,477,431 | B1 | 10/2016 | Chen et al. |
| 9,513,814 | B1 | 12/2016 | Can et al. |
| 9,529,545 | B1 | 12/2016 | Bono et al. |
| 9,542,125 | B1 | 1/2017 | Chen |
| 9,594,514 | B1 | 3/2017 | Bono et al. |
| 9,684,593 | B1 | 6/2017 | Chen et al. |
| 9,710,187 | B1 | 7/2017 | Si et al. |
| 9,811,288 | B1 | 11/2017 | Chen et al. |
| 9,817,766 | B1 | 11/2017 | Si et al. |
| 10,037,369 | B1 | 7/2018 | Bono et al. |
| 10,048,874 | B1 | 8/2018 | Shveidel et al. |
| 10,082,959 | B1 | 9/2018 | Chen et al. |
| 10,095,428 | B1 | 10/2018 | Meiri et al. |
| 10,152,381 | B1 | 12/2018 | Shvaiger et al. |
| 10,176,046 | B1 | 1/2019 | Hu et al. |
| 10,235,066 | B1 | 3/2019 | Chen et al. |
| 10,248,623 | B1 | 4/2019 | Chen et al. |
| 10,261,853 | B1 | 4/2019 | Chen et al. |
| 10,310,951 | B1 | 6/2019 | Chen et al. |
| 10,324,640 | B1 | 6/2019 | Chen et al. |
| 10,338,851 | B1 | 7/2019 | Kronrod et al. |
| 10,353,616 | B1 | 7/2019 | Tao et al. |
| 10,359,968 | B1 | 7/2019 | Chen et al. |
| 10,374,792 | B1 | 8/2019 | Meiri et al. |
| 10,394,485 | B1 | 8/2019 | Chen et al. |
| 10,402,283 | B1 | 9/2019 | Chen et al. |
| 10,409,493 | B1 | 9/2019 | Kucherov et al. |
| 10,459,632 | B1 | 10/2019 | Chen et al. |
| 10,459,883 | B1 | 10/2019 | Meiri et al. |
| 10,496,489 | B1 | 12/2019 | Chen et al. |
| 10,496,668 | B1 | 12/2019 | Meiri et al. |
| 10,496,672 | B2 | 12/2019 | Meiri et al. |
| 10,565,058 | B1 | 2/2020 | Meiri et al. |
| 2013/0204960 | A1* | 8/2013 | Ashok ..................... G06F 3/067 709/213 |
| 2013/0205005 | A1 | 8/2013 | Ashok et al. |
| 2014/0304437 | A1 | 10/2014 | Ashok et al. |
| 2015/0089008 | A1* | 3/2015 | Sridharan ........... H04L 47/2433 709/207 |
| 2016/0291876 | A1* | 10/2016 | Alatorre ................ G06F 3/0644 |
| 2016/0291892 | A1* | 10/2016 | Rao ........................ G06F 3/0629 |
| 2017/0156161 | A1 | 6/2017 | Kang et al. |
| 2017/0242596 | A1* | 8/2017 | Liu ........................ G06F 3/0659 |
| 2017/0371558 | A1 | 12/2017 | George et al. |
| 2018/0011801 | A1* | 1/2018 | Sengupta ............... G06F 3/0659 |
| 2019/0121558 | A1 | 4/2019 | Lee et al. |
| 2019/0332443 | A1* | 10/2019 | Kelly .................... G06F 9/5077 |
| 2019/0372866 | A1* | 12/2019 | Ganguli .............. H04L 49/9047 |
| 2020/0034058 | A1 | 1/2020 | Shveidel |
| 2020/0125291 | A1 | 4/2020 | Shveidel |
| 2020/0274823 | A1* | 8/2020 | Yang ....................... H04L 47/20 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.
Notice of Allowance dated May 18, 2021 for U.S. Appl. No. 16/786,422; 19 pages.

* cited by examiner

| IO IDENTIFIER | IO LATENCY FACTOR | COMPONENT LATENCY FACTOR |
|---|---|---|
| IO-1 | 1 | 1 |
| IO-2 | 0 | 1 |
| IO-3 | 1 | 0 |
| IO-4 | 1 | .5 |
| ... | | |
| IO-n | 0 | 0 |

FIG. 3

SENSITIVITY MATRIX FOR SYSTEM LOAD INDICATION AND OVERLOAD PREVENTION

BACKGROUND

Storage systems are designed to handle certain levels of IO workloads. When the workload is well within the designed load capacity, the IO processing latency may be flat. When the workload approaches or exceeds designed capacity, the processing latency may increase sharply. After the workload exceeds a set tipping point, the system may be pushed out of its stable state, and the IO handling latency may grow exponentially. Thus, it is helpful for a system to control the workload within this tipping point and prevent the overload from occurring. On the other hand, if the system controls the load too aggressively, this may cause the system to be underutilized.

Some systems throttle the total number of IO tasks in the system and reject incoming IOs upon detecting an overload situation. These systems may use some form of latency calculation over time as an indicator of the system load, which may work well assuming the IO requests follow a certain standard distribution or can be normalized using some adjustment (e.g., by IO size).

On the other hand, for certain IOs (e.g., those with different priorities) and certain services (sync or active/active replication), additional latencies may not be caused by system load. In this situation, it is not helpful to begin throttling IOs. For example, in sync replication, the time spent on remote data transfer does not contribute significantly to the local system load, and in active/active replication, the time spent to resolve distributed address lock collision does not indicate system overload. If the system gives high priority to certain application IOs over other application IOs, a longer average latency of lower priority IOs may due to scheduling queuing, not necessarily system overload.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect provides a method for input/output (IO) flow control in a storage system. The method includes receiving an IO latency factor for each IO of a plurality of IOs in a workload. The IO latency factor specifies a priority level. The method also includes receiving a component latency factor, with respect to each of the IOs in the workload, for each component of a plurality of components in the storage system. The component latency factor indicates a degree to which the component is considered in assessing the workload. The method also includes processing the plurality of IOs in the workload. The processing includes applying, during processing of the workload, the IO latency factor and the component latency factor to each of the IOs; and determining an effective average latency of the plurality of IOs in the workload as a function of the applied IO latency factors and the applied component latency factors. The method further includes modifying the IO flow control of incoming IOs in the storage system as a function of the effective average latency.

Another aspect provides a system for input/output (IO) flow control in a storage system. The system includes a memory having computer-executable instructions and a processor operable by a storage system. The processor executes the computer-executable instructions. The computer-executable instructions when executed by the processor cause the processor to perform operations. The operations include receiving an IO latency factor for each IO of a plurality of IOs in a workload. The IO latency factor specifies a priority level. The operations also include receiving a component latency factor, with respect to each of the IOs in the workload, for each component of a plurality of components in the storage system. The component latency factor indicates a degree to which the component is considered in assessing the workload. The operations further include applying, during processing of the workload, the IO latency factor and the component latency factor to each of the IOs; and determining an effective average latency of the plurality of IOs in the workload as a function of the applied IO latency factors and the applied component latency factors. The operations also include modifying the IO flow control of incoming IOs in the storage system as a function of the effective average latency.

A further aspect provides a computer program product for input/output (IO) flow control in a storage system. The computer program product includes the computer program product embodied on a non-transitory computer readable medium, the computer program product including instructions that, when executed by a computer, cause the computer to perform operations. The operations include receiving an IO latency factor for each IO of a plurality of IOs in a workload. The IO latency factor specifies a priority level. The operations also include receiving a component latency factor, with respect to each of the IOs in the workload, for each component of a plurality of components in the storage system. The component latency factor indicates a degree to which the component is considered in assessing the workload. The operations further include applying, during processing of the workload, the IO latency factor and the component latency factor to each of the corresponding IOs; and determining an effective average latency of the plurality of IOs in the workload as a function of the applied IO latency factors and the applied component latency factors. The operations also include modifying the IO flow control of incoming IOs in the storage system as a function of the effective average latency.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 3 is a diagram depicting a data structure with sample IO latency factor assignments and sample component latency factor assignments for IOs of a given workload according to an embodiment;

DETAILED DESCRIPTION

Storage systems are designed to handle certain levels of IO workloads. When the workload is well within the designed load capacity, the IO processing latency may be flat. When the workload approaches or exceeds designed capacity, the processing latency may increase sharply. After the workload exceeds a set tipping point, the system may be pushed out of its stable state, and the IO handling latency may grow exponentially. Thus, it is helpful for a system to control the workload within this tipping point and prevent the overload from occurring. On the other hand, if the system controls the load too aggressively, this may cause the system to be underutilized.

Some systems throttle the total number of IO tasks in the system and reject incoming IOs upon detecting an overload situation. These systems may use an average IO latency value as an indicator of the system load, which may work well assuming the IO requests follow a certain standard distribution or can be normalized using some adjustment (e.g., by IO size).

On the other hand, for certain IOs (e.g., those with different priorities) and certain services (sync or active/active replication), additional latencies may not be caused by system load. In this situation, it is not helpful to begin throttling IOs. For example, in sync replication, the time spent on remote data transfer does not contribute significantly to the local system load, and in active/active replication, the time spent to resolve distributed address lock collision does not indicate system overload. If the system gives high priority to certain application IOs over other application IOs, a longer average latency of lower priority IOs may due to scheduling queuing, not necessarily system overload.

Illustrative embodiments provide a storage system with functionality for IO flow control in the storage system. The embodiments provide a solution to handle replication latency while maintaining optimal flow control. In embodiments, a sensitivity matrix is provided with a flow control mechanism which includes an IO latency factor and a component latency factor that are applied to IOs of a workload in order to determine latencies in the workload processes that account for the type of IO being processed (i.e., a priority level of the IO), as well as components and services associated with processing the IO. Timewise, the processes may also detect latency change trends by monitoring the rate of change of the average latency. If the latency increases, the but the rate of change is low, then the latency increase may be due to workload pattern changes that are capable of system handling. However, if the rate of change increases sharply, this may reflect a more significant situation such as signal overload.

Figure 1:
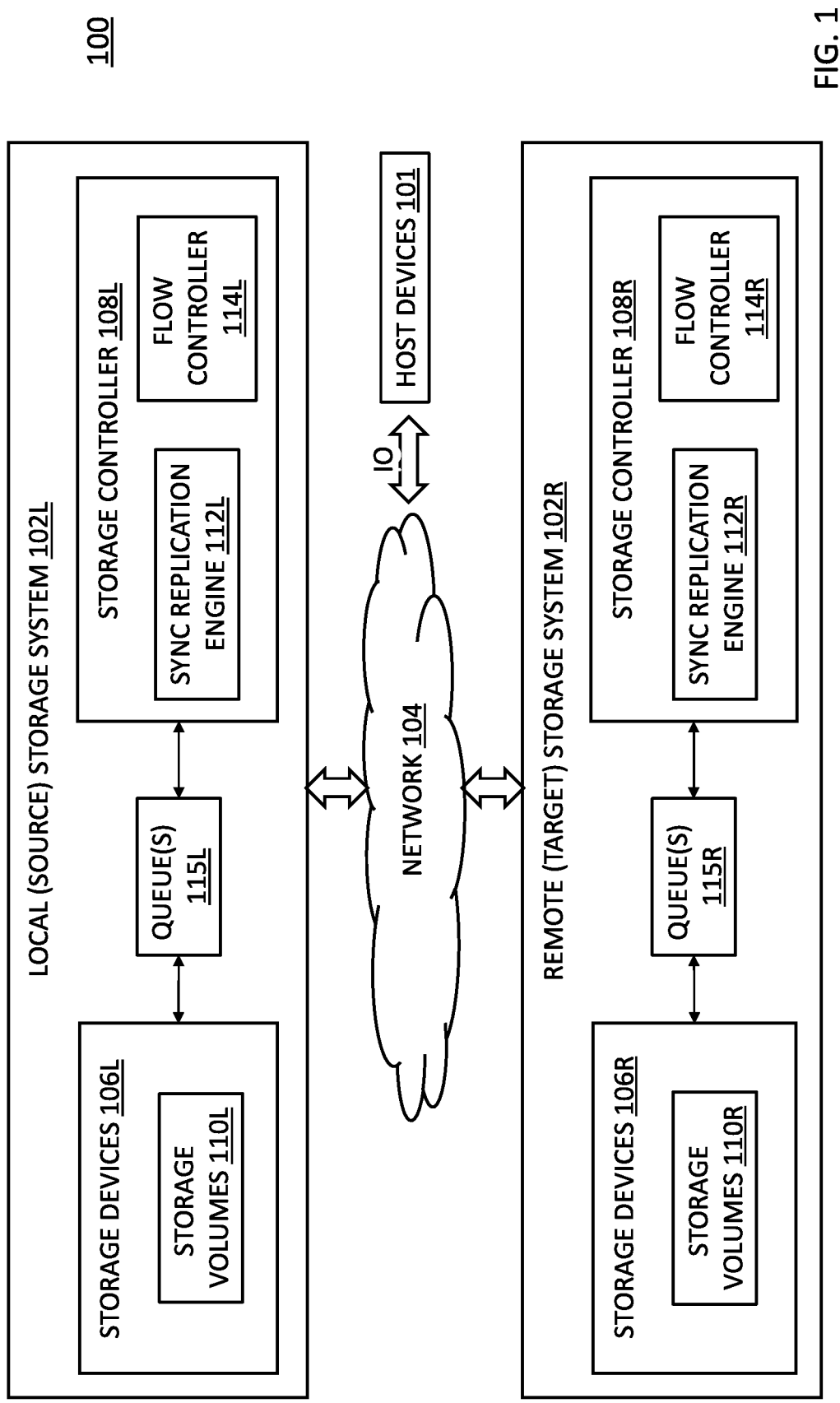
FIG. 1 depicts a block diagram of an information processing system including local and remote storage systems configured with functionality for implementing IO flow control according to an embodiment.

FIG. 1 shows an information processing system 100 configured in accordance with an illustrative embodiment. The information processing system 100 comprises a plurality of host devices 101, a local storage system 102L (also referred to herein as "source" storage system) and a remote storage system 102R (also referred to herein as "target" storage system). The local storage system and the remote storage system are collectively referred to herein as storage systems 102. The host devices 101 and storage systems 102 are each configured to communicate with one another over a network 104. The local and remote storage systems 102 are more particularly configured in this embodiment to participate in a replication process in which one or more storage volumes are replicated from the local storage system 102L to the remote storage system 102R, possibly with involvement of at least one of the host devices 101. The type of replication may be one or more of a synchronous replication process, an asynchronous replication process, and an active/active replication process. The one or more storage volumes that are replicated from the local storage system 102L to the remote storage system 102R are illustratively part of a designated consistency group.

Each of the storage systems 102 is illustratively associated with a corresponding set of one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices. Such applications illustratively generate input/output (IO) operations that are processed by a corresponding one of the storage systems 102. The term "IO" as used herein refers to at least one of input and output. For example, IO operations may comprise write requests and/or read requests directed to stored data of a given one of the storage systems 102. The storage systems 102 illustratively comprise respective processing devices of one or more processing platforms. For example, the storage systems 102 can each comprise one or more processing devices each having a processor and a memory, possibly implementing virtual machines and/or containers, although numerous other configurations are possible.

The storage systems 102 may be implemented on a common processing platform, or on separate processing platforms.

The host devices 101 are illustratively configured to write data to and read data from the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The local storage system 102L comprises a plurality of storage devices 106L and an associated storage controller 108L. The storage devices 106L store storage volumes 110L and queues 115L. The storage volumes 110L illustratively comprise respective logical units (LUNs) or other types of logical storage volumes. The queues 115L may store incoming IOs waiting to be processed by the local storage system 102L.

Similarly, the remote storage system 102R comprises a plurality of storage devices 106R and an associated storage controller 108R. The storage devices 106R store storage volumes 110R, at least a portion of which represent respective LUNs or other types of logical storage volumes that are replicated from the local storage system 102L to the remote storage system 102R in accordance with a replication process. The storage devices 106R also store one or more queues 115R.

The storage devices 106 of the storage systems 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM PC-RAM and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers.

For example, the fast tier may comprise flash drives or other types of SSDs while the capacity tier comprises HDDs. The particular storage devices used in a given storage tier may be varied in other embodiments, and multiple distinct storage device types may be used within a single storage tier.

The term "storage device" as used herein is intended to be broadly construed, to encompass, for example, SSDs, HDDs, flash drives, hybrid drives or other types of storage devices.

In some embodiments, at least one of the storage systems 102 illustratively comprises a scale-out all-flash content addressable storage array such as an XtremIO storage array, of DELL EMC of Hopkinton, Mass.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage controller 108L of local storage system 102L in the FIG. 1 embodiment includes replication control logic 112L and a flow controller 114L.

Similarly, the storage controller 108R of remote storage system 102R includes replication control logic 112R and a flow controller 114T. In embodiments, the flow controllers 114L and 114T, in conjunction with the replication control logic 112L and 112R, respectively, facilitate IO flow control through the sensitivity matrix described herein. The sensitivity matrix operates on IO-related latencies and component- and service-related latencies to identify and assess actual latency values for a workload. In some embodiments, the terms component and service and are used interchangeably.

Although not explicitly shown in the Figure, additional components can be included in the storage controllers 108, such as signature generators utilized in generating content-based signatures of data pages.

The instances of replication control logic 112L and 112R are collectively referred to herein as replication control logic 112. Such replication control logic instances are also referred to herein as individually or collectively comprising at least a portion of a "replication engine" of the system 100.

The replication control logic 112 of the storage systems 102 controls performance of the replication process carried out between those storage systems, which as noted above in some embodiments further involves at least one of the host devices 101. The data replicated from the local storage system 102L to the remote storage system 102R can include all of the data stored in the local storage system 102L, or only certain designated subsets of the data stored in the local storage system 102L, such as particular designated sets of LUNs or other logical storage volumes. Different replication processes of different types can be implemented for different parts of the stored data. Also, the storage systems 102 can be configured to operate in different replication modes of different types at different times.

A given storage volume designated for replication from the local storage system 102L to the remote storage system 102R illustratively comprises a set of one or more LUNs or other instances of the storage volumes 110L of the local storage system 102L. Each such LUN or other storage volume illustratively comprises at least a portion of a physical storage space of one or more of the storage devices 106L. The corresponding replicated LUN or other storage volume of the storage volumes 110R of the remote storage system 102R illustratively comprises at least a portion of a physical storage space of one or more of the storage devices 106R.

Figure 2A:
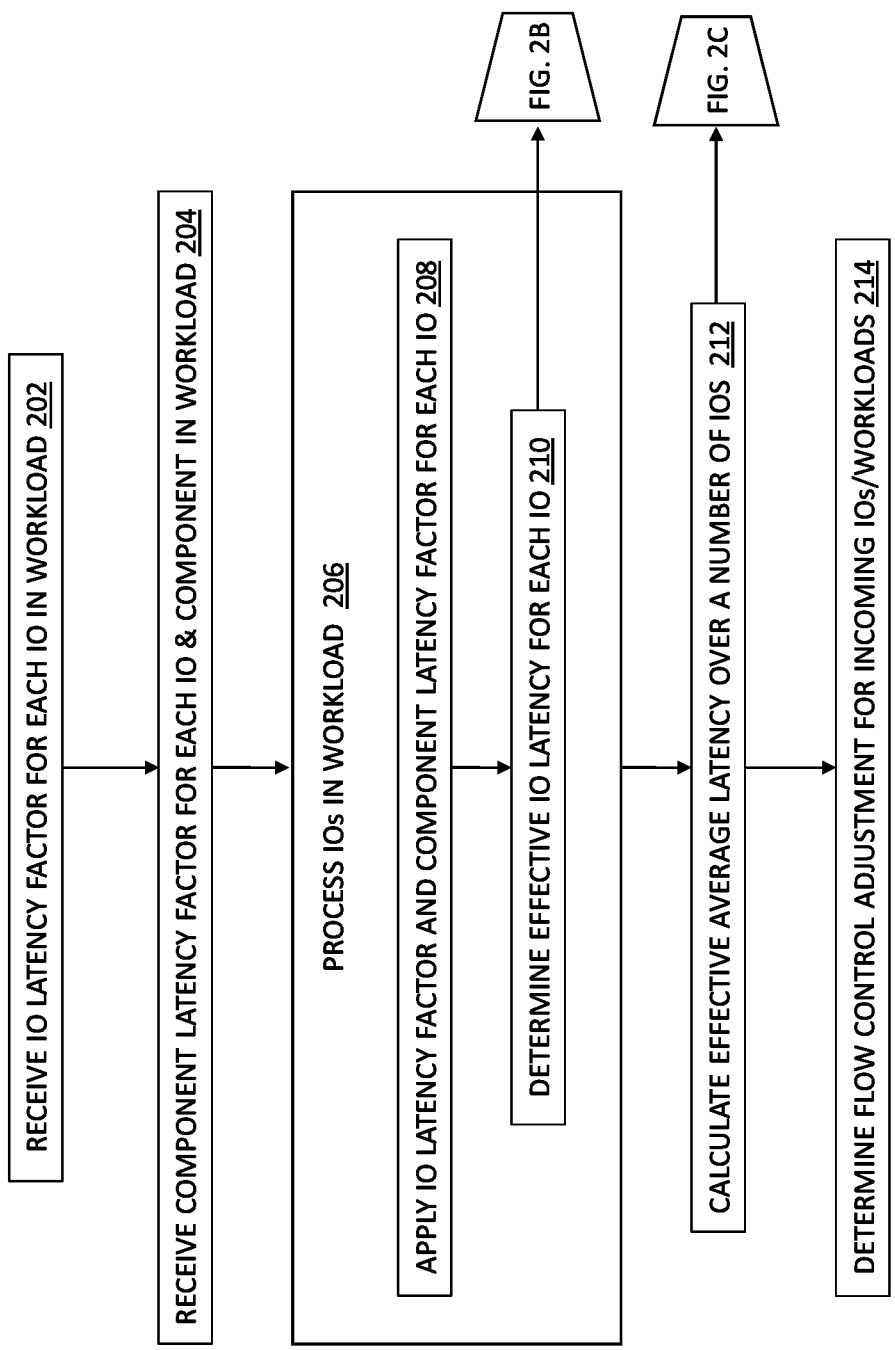
FIGS. 2A-2C are flow diagrams of a process for implementing IO flow control according to an embodiment.
Figure 2B:
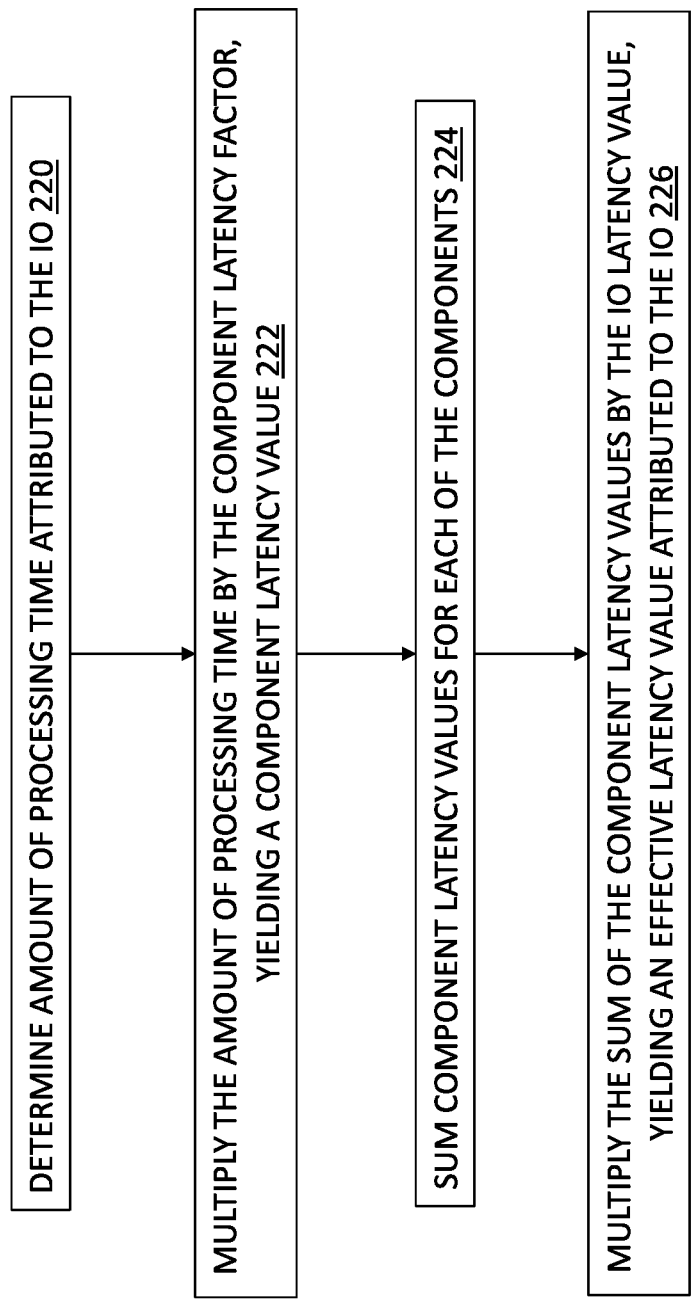
Figure 2C:
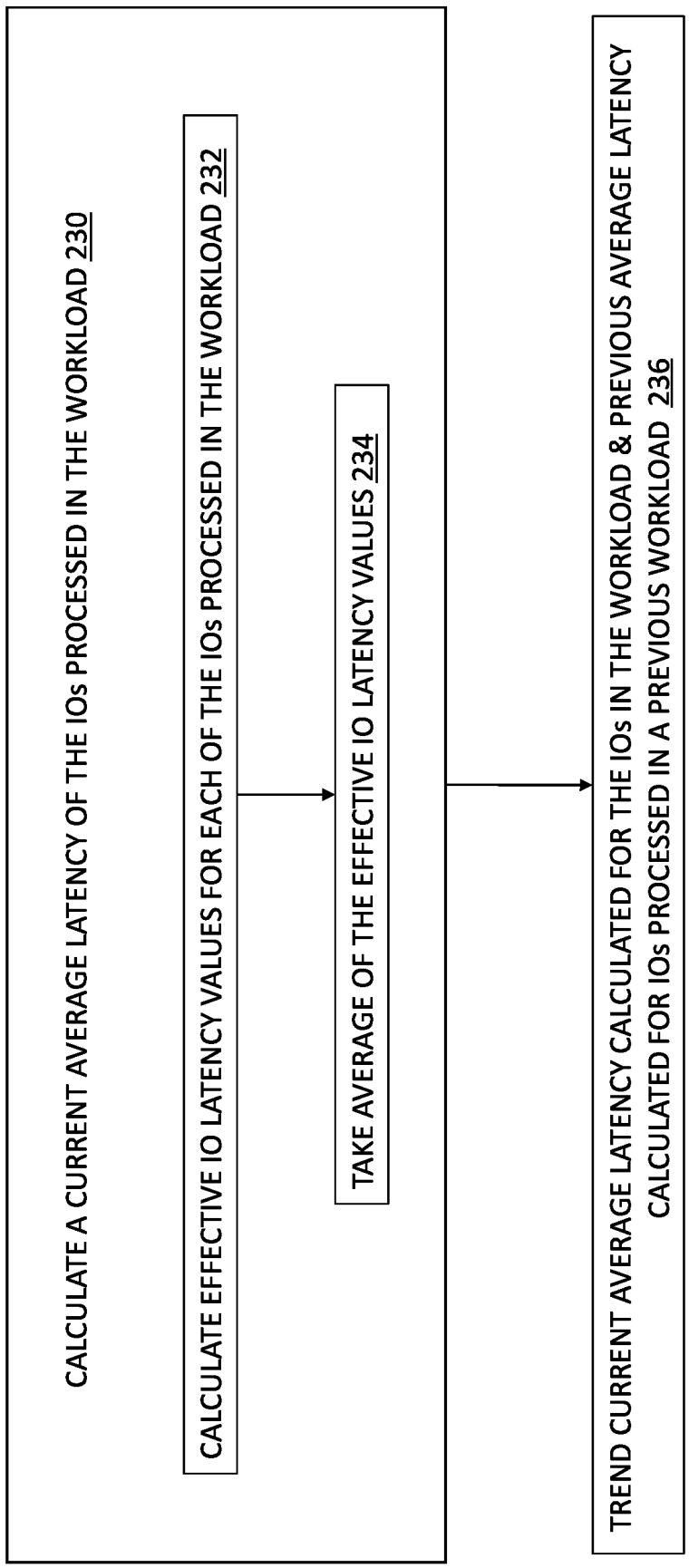

The replication control logic 112 of the storage systems 102 in some embodiments is configured to control the performance of corresponding portions of a replication process of the type illustrated in the flow diagram of FIGS. 2A-2C.

The storage controllers 108 of the storage systems 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing replication process being carried out between the local storage system 102L and the remote storage system 102R in the system 100, utilizing their respective instances of replication control logic 112L and 112R.

The replication process more particularly comprises a replication process in which a consistency group comprising one or more storage volumes is replicated from the local storage system 102L to the remote storage system 102R as part of host IO handling. Such an arrangement is illustratively configured to guarantee data consistency between the storage volumes of the consistency group on the local and their corresponding replicated versions on the remote. The replication is illustratively implemented at least in part by or otherwise under the control of the local and remote instances of replication control logic 112L and 112R. Other types of replication arrangements can be used in other embodiments.

In embodiments in which the storage systems 102 comprise content addressable storage systems, address metadata is illustratively utilized to provide content addressable storage functionality within those systems. The address metadata in some embodiments comprises at least a portion of one or more logical layer mapping tables that map logical addresses of respective ones of the data pages of the storage volume to corresponding content-based signatures of the respective data pages. Examples of logical layer mapping tables and other metadata structures maintained by at least the storage controller 108R of remote storage system 102R will be described elsewhere herein.

The storage systems 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage systems 102 may be implemented on respective distinct processing platforms, although numerous other arrangements are possible. At least portions of their associated host devices may be implemented on the same processing platforms as the storage systems 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage systems 102 to reside in different data centers.

Numerous other distributed implementations of the storage systems 102 and their respective associated sets of host devices are possible.

Additional examples of processing platforms utilized to implement storage systems and possibly their associated host devices in illustrative embodiments will be described in more detail below in conjunction with FIGS. 5 and 6.

It is to be appreciated that these and other features of illustrative embodiments are presented by way of example only and should not be construed as limiting in any way.

Accordingly, different numbers, types and arrangements of system components such as host devices 101, storage systems 102, network 104, storage devices 106, storage controllers 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, at least portions of the above-described functionality for flow control in a replication process can be implemented in one or more host devices, or partially in a host device and partially in a storage system. Illustrative embodiments are not limited to arrangements in which all such functionality is implemented in local and remote storage systems or a host device, and therefore encompass various hybrid arrangements in which the functionality is distributed over one or more storage systems and one or more associated host devices, each comprising one or more processing devices. References herein to "one or more processing devices" configured to implement particular operations or other functionality should be understood to encompass a wide variety of different arrangements involving one or more processing devices of at least one storage system and/or at least one host device.

As another example, it is possible in some embodiments that the local storage system and the remote storage system can comprise different portions of the same storage system. In such an arrangement, a replication process is illustratively implemented to replicate data from one portion of the storage system to another portion of the storage system. The terms "local storage system" and "remote storage system" as used herein are therefore intended to be broadly construed so as to encompass such possibilities.

The operation of the information processing system 100 will now be described in further detail with reference to the flow diagrams of the illustrative embodiment of FIGS. 2A-2C, which implement a replication process (e.g., a synchronous replication process, an asynchronous replication process, and/or an active/active replication process). The steps of the process illustratively involve interactions between a local storage system and a remote storage system, referred to as respective "local" and "remote" in these Figures, illustratively utilizing replication control logic instances and flow controllers of storage controllers of the local and remote. For example, replication control logic of the local interacts with replication control logic of the remote in performing multiple cycles of replication for a consistency group. It is possible in other embodiments that at least one of the storage systems does not include replication control logic and a flow controller, and in such embodiments these components are instead implemented in one or more host devices.

The flow control process as illustrated in FIGS. 2A-2C is suitable for use in system 100 but is more generally applicable to other types of information processing systems in which data is replicated between sites (e.g., from local to remote). Also, the roles of local and remote can be reversed, as in a situation in which a failover from local to remote occurs.

In embodiments, a sensitivity matrix is provided with a flow control mechanism which includes an IO latency factor and a component latency factor that are applied to IOs of a workload in order to determine latencies in the workload processes that account for the type of IO being processed (i.e., a priority level of the IO), as well as components and services associated with processing the IO. The embodiments described herein defines a latency sensitivity factor ($0<=f\_io\_latency<=1$) to latency insensitive IOs (low priority IOs). In addition, the embodiments define a latency sensitivity factor ($0<=f\_comp\_latency<=1$) to latency insensitive components/services. Timewise, the processes may also detect latency change trends by monitoring the rate of change of the average latency. If the latency increases, but the rate of change is low, then the latency increase may be due to workload pattern changes that are capable of system handling. However, if the rate of change increases sharply, this may reflect a more significant situation such as signal overload.

Turning now to FIG. 2A, the flow control process will now be described. In block 202, the process 200A receives an IO latency factor for each IO of a plurality of IOs in a workload. The IO latency factor specifies a priority level and is considered a first element of the sensitivity matrix. As indicated above, the IO latency factor may be a value expressed as $0<=f\_io\_latency<=1$. For example, in an embodiment, a high priority IO may be assigned an IO latency factor of 1 and a low priority IO may be assigned an IO latency factor of 0.

In block 204, the process 200A receives a component latency factor, with respect to each of the IOs in the workload, for each component (and/or service) in the storage system. The component latency factor is considered a second element of the sensitivity matrix. Components include, e.g., modules, caches, persistent storage, etc. The component latency factor indicates a degree to which the component is considered in assessing the workload. The component latency factor may be a value expressed as $0<=f\_comp\_latency<=1$. For example, a component that should not be considered in a latency determination may be assigned a value of 0, while a component that should be considered in the latency determination may be assigned a value of 1. It will be understood that values between 0 and 1 may be assigned to a component when the component should be partially considered in determining latency of an IO. The component latency factor measures an amount of time the IO is processed through a corresponding one of the components. Services may include, e.g., synchronous replication remote data transfer functions (where the replication is synchronous replication), and address lock resolution functions (where the replication is active/active replication).

FIG. 3 illustrates a data structure 300 with sample IOs and corresponding IO and component latency factors. As shown in FIG. 3, the structure 300 includes IO identifiers 302 in a workload. The structure 300 also shows IO latency factors 304 and component latency factors 306 assigned to respective IO identifiers 302. It will be understood that the latency factor assignments may take the form of any type of data structure. The structure 300 shown in FIG. 3 is provided by way of illustration only and is not limited to the particular structure shown.

In block 206, the process 200A executes the plurality of IOs in the workload. In embodiments, the execution step includes applying, in block 208, the IO latency factor and the component latency factor to each of the corresponding IOs. In block 210, the process 200A determines an effective IO latency for each IO in the workload from the applied IO latency factor and the applied component latency factor. The effective IO latency determination is described further in FIG. 2B.

In block 212, the process 200A calculates the effective average latency over a number of IOs processed. The effective average latency step is described further in FIG. 2C.

In block 214, the process 200A may modify the flow control of incoming IOs as a function of the effective average latency determination. For example, upon determining the effective average latency is less than a threshold value, the process 200A increases an amount of the incoming IOs. Likewise, if the effective average latency is greater than a threshold value, the process 200A decreases the amount of the incoming IOs.

Turning now to FIG. 2B, a process 200B for determining the effective latency for an IO (from block 210 of FIG. 2A) includes, for each component of the components in the system that processes the IO (as determined by the component latency value), determining in block 220 an amount of processing time attributed to the IO. In block 222, the process 200B multiplies the amount of processing time by the component latency factor, yielding a component latency value.

In block 224, the process 200B sums the component latency values for each of the components and, in block 226, the process 200B multiplies the sum of the component latency values by the IO latency value, yielding an effective IO latency value attributed to the IO. This effective IO latency value may be used as a load indicator value (e.g., replacing IO latency statistics).

Turning now to FIG. 2C, the effective average latency is calculated over a number of IOs. A process 200C includes calculating a current average latency of the IOs processed in the workload in block 230. This calculation from block 230 includes calculating effective IO latency values for each of the IOs processed in the workload in block 232 and taking an average of the effective IO latency values in block 234. Block 232 corresponds to the process described in FIG. 2B.

Determining the effective average latency includes, in block 236, trending the current average latency calculated for the IOs processed in the workload and a previous average latency calculated for IOs processed in a previous workload.

The particular processing operations and other system functionality described in conjunction with the flow diagrams of FIGS. 2A-2C and data structure 300 of FIG. 3 are presented by way of illustrative example only and should not be construed as limiting the scope of the disclosure in any way. Alternative embodiments can use other types of processing operations to provide flow control in conjunction with a replication process. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different replication processes for respective different consistency groups comprising different sets of storage volumes or for different storage systems or portions thereof within a given information processing system.

Functionality such as that described in conjunction with the flow diagrams of FIGS. 2A-2C can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage systems 102 that are configured to control performance of one or more steps of the FIGS. 2A-2C process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

In some implementations of the FIGS. 2A-2C process, the local and remote storage systems comprise content addressable storage systems configured to maintain various metadata structures that are utilized in the flow control processes. Examples of metadata structures maintained by the local and remote storage systems in illustrative embodiments include the logical layer and physical layer mapping tables described below. It is to be appreciated that these particular tables are only examples, and other tables or metadata structures having different configurations of entries and fields can be used in other embodiments.

An address-to-hash ("A2H") utilized in some embodiments comprises a plurality of entries accessible utilizing logical addresses as respective keys, with each such entry of the A2H table comprising a corresponding one of the logical addresses, a corresponding hash handle, and possibly one or more additional fields.

A hash-to-data ("H2D") table utilized in some embodiments comprises a plurality of entries accessible utilizing hash handles as respective keys, with each such entry of the H2D table comprising a corresponding one of the hash handles, a physical offset of a corresponding one of the data pages, and possibly one or more additional fields.

A hash metadata ("HMD") table utilized in some embodiments comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table may also include one or more additional fields.

A physical layer based ("PLB") table utilized in some embodiments illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Also, it is to be appreciated that terms such as "table" and "entry" as used herein are intended to be broadly construed, and the particular example table and entry arrangements described above can be varied in other embodiments. For example, additional or alternative arrangements of entries can be used.

In some embodiments, the storage system may comprise an XtremIO storage array or other type of content addressable storage system suitably modified to incorporate functionality for flow control processes in conjunction with a replication process as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage systems 102, and accordingly is assumed to be coupled to the other one of the storage systems 102 and to one or more host devices of a computer system within information processing system 100.

Although it is assumed that both the local storage system 102L and the remote storage system 102R are content addressable storage systems in some embodiments, other types of storage systems can be used for one or both of the local storage system 102L and the remote storage system 102R in other embodiments. For example, it is possible that at least one of the storage systems 102 in an illustrative embodiment need not be a content addressable storage system and need not include an ability to generate content-based signatures. In such an embodiment, at least portions of the process functionality of the one or more storage systems can be implemented in a host device.

The storage controller 408 in the present embodiment is configured to implement functionality for flow control processes of the type previously described in conjunction with FIGS. 1 through 3. For example, the content addressable storage system 405 illustratively participates as a local storage system in a replication process with a remote storage system that may be implemented as another instance of the content addressable storage system 405.

The storage controller 408 includes distributed modules 412 and 414, which are configured to operate in a manner similar to that described above for respective corresponding replication control logic 112 and flow controllers 114 of the storage controllers 108 of system 100. Module 412 is more particularly referred to as distributed replication control logic, and illustratively comprises multiple replication control logic instances on respective ones of a plurality of distinct nodes. Module 414 is more particularly referred to as a distributed flow controller, and illustratively comprises multiple flow control instances on respective ones of the distinct nodes.

Figure 4:
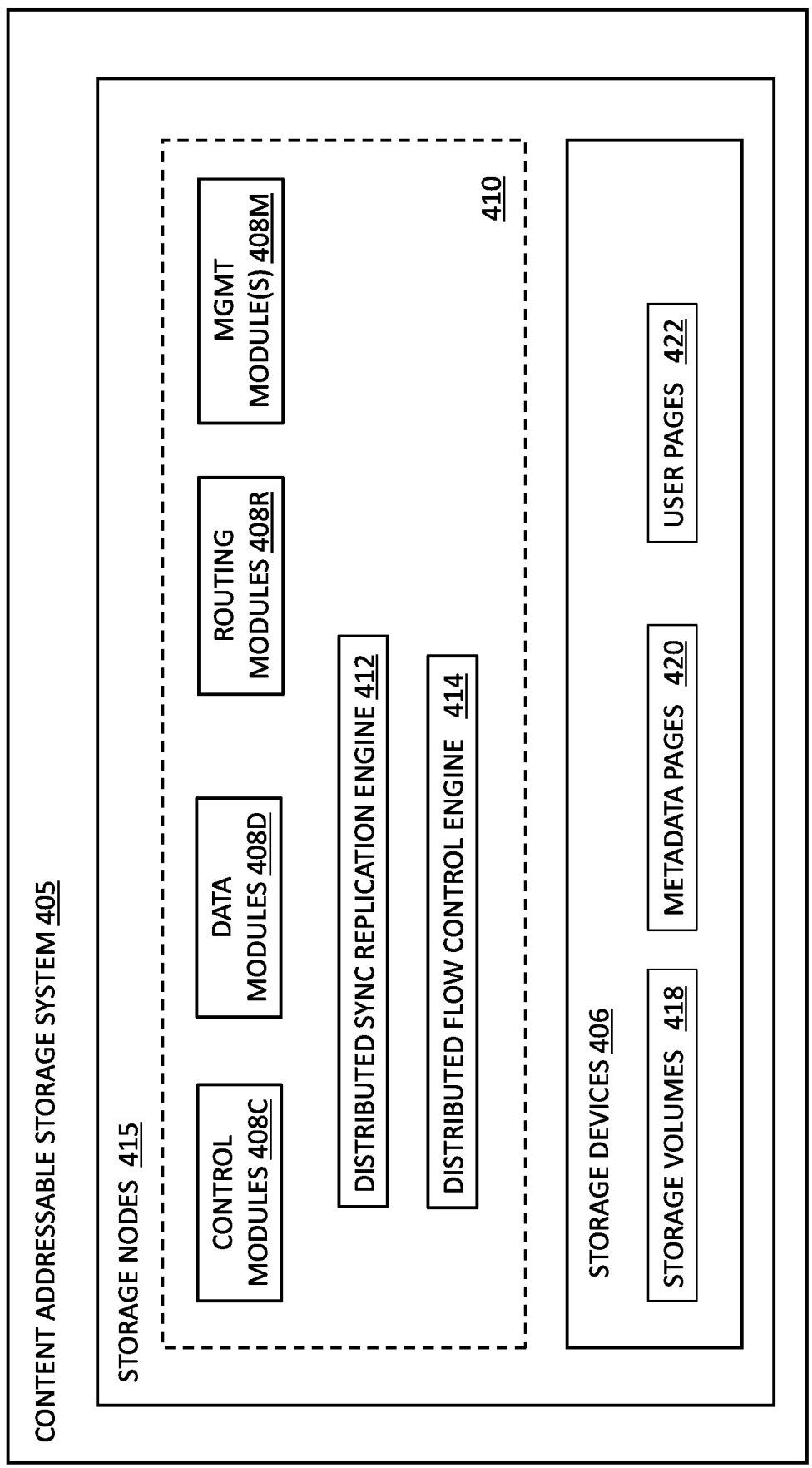
FIG. 4 depicts a content addressable storage system having a distributed storage controller configured with functionality for implementing IO flow control according to an embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 is referred to as distributed storage controller 408.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415. A given set of processing modules implemented on a particular one of the storage nodes 415 therefore illustratively includes at least one control module 408C, at least one data module 408D and at least one routing module 408R, and possibly a management module 408M.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the flow control functionality of the modules 412 and 414 may be implemented in one or more of the other modules of the storage controller 408. In other embodiments, the modules 412 and 414 may be implemented as stand-alone modules of the storage controller 408. In embodiments, the flow control processes described in FIGS. 2A-2C may define, as the component latency value, values associated with components such as any one or more of the modules 408C, 408D, and 408R. In this embodiment, the IO latency factor is a horizontally defined for latency insensitive IOs, and the IO component factor is vertically defined for latency insensitive components, such as the modules. The components are vertically defined as the IO flow proceeds in a designated ordering among the modules (e.g., from routing module 408R to control module 408C, to data module 408D).

The storage devices 406 may be configured to store volumes 418, as well as metadata pages 420 and user data pages 422 and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406. A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which content-based signatures are generated using modules 412 and 414 illustratively comprises a set of one or more LUNs, each including multiple ones of the user data pages 422 stored in storage devices 406. The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The flow control functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a replication control logic instance that engages corresponding replication control logic instances in all of the control modules 408C and routing modules 408R in order to implement a replication process. In some embodiments, the content addressable storage system 405 comprises an XtremIO storage array suitably modified to incorporate flow control functionality as disclosed herein.

In arrangements of this type, the control modules 408C, data modules 408D and routing modules 408R of the distributed storage controller 408 illustratively comprise respective C-modules, D-modules and R-modules of the XtremIO storage array. The one or more management modules 408M of the distributed storage controller 408 in such arrangements illustratively comprise a system-wide management module ("SYM module") of the XtremIO storage array, although other types and arrangements of system-wide management modules can be used in other embodiments. Accordingly, flow control functionality in some embodiments is implemented under the control of at least one system-wide management module of the distributed storage controller 408, utilizing the C-modules, D-modules and R-modules of the XtremIO storage array.

In the above-described XtremIO storage array example, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405 and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 405. The HMD table or a given portion thereof in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping. The second level of mapping using the HMD table associates respective ones of the content-based signatures with respective physical storage locations in one or more of the storage devices 106. This is also referred to as physical layer mapping.

Examples of these and other metadata structures utilized in illustrative embodiments were described above in conjunction with FIGS. 2A-2C. These particular examples include respective A2H, H2D, HMD and PLB tables. In some embodiments, the A2H and H2D tables are utilized primarily by the control modules 408C, while the HMD and PLB tables are utilized primarily by the data modules 408D.

For a given write request, hash metadata comprising at least a subset of the above-noted tables is updated in conjunction with the processing of that write request. The A2H, H2D, HMD and PLB tables described above are examples of what are more generally referred to herein as "mapping tables" of respective distinct types. Other types and arrangements of mapping tables or other content-based signature mapping information may be used in other embodiments. Such mapping tables are still more generally referred to herein as "metadata structures" of the content addressable storage system 405. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement flow control functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

In some embodiments, the local and remote storage systems are illustratively implemented as respective content addressable storage systems, but in other embodiments one or more of the storage systems can instead be a traditional storage array, which does not support any type of content addressable storage functionality, with any missing functionality being provided by a host device. Accordingly, functionality for flow control in replication as disclosed herein can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with flow control functionality will now be described in greater detail with reference to FIGS. 5 and 6. Although described in the context of system 100, these platforms may also be used to implement at least portions of other information processing systems in other embodiments.

Figure 5:
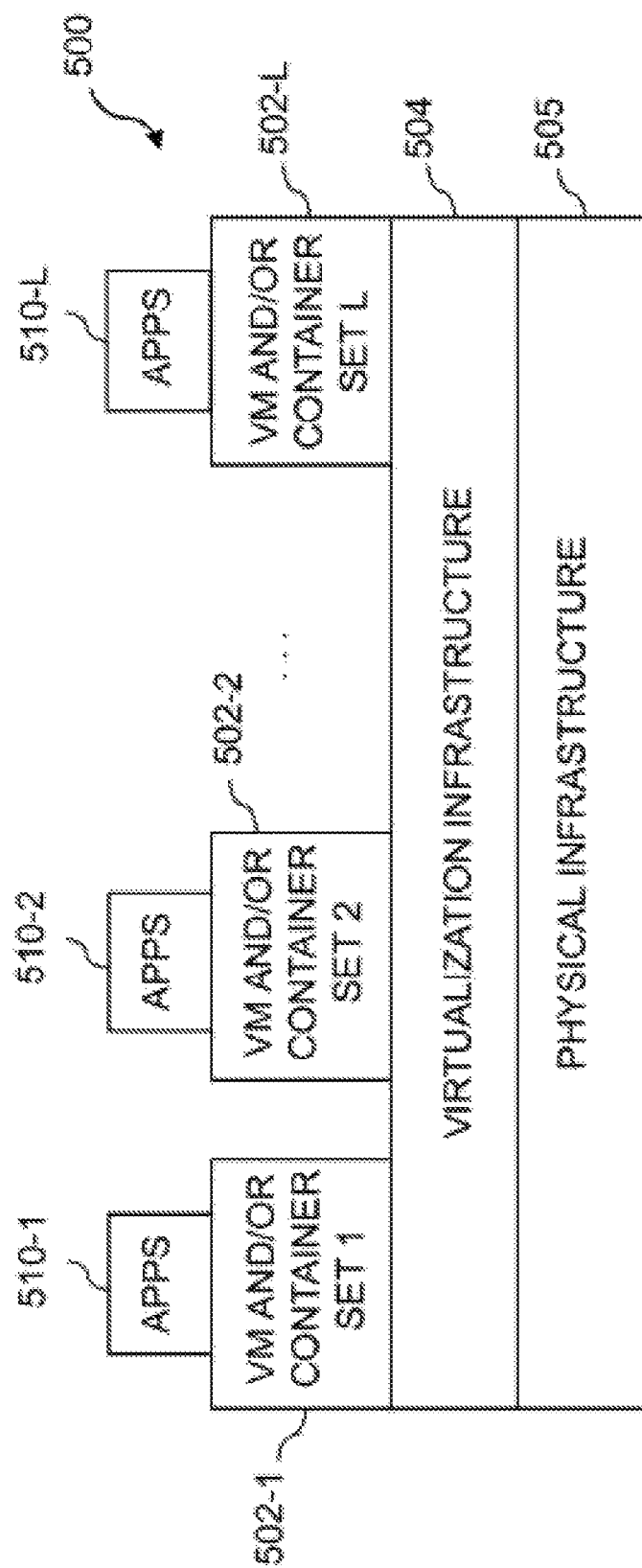
FIG. 5 depicts a cloud infrastructure-based processing platform with physical and virtual processing resources for implementing IO flow control in accordance with an embodiment.
Figure 6:
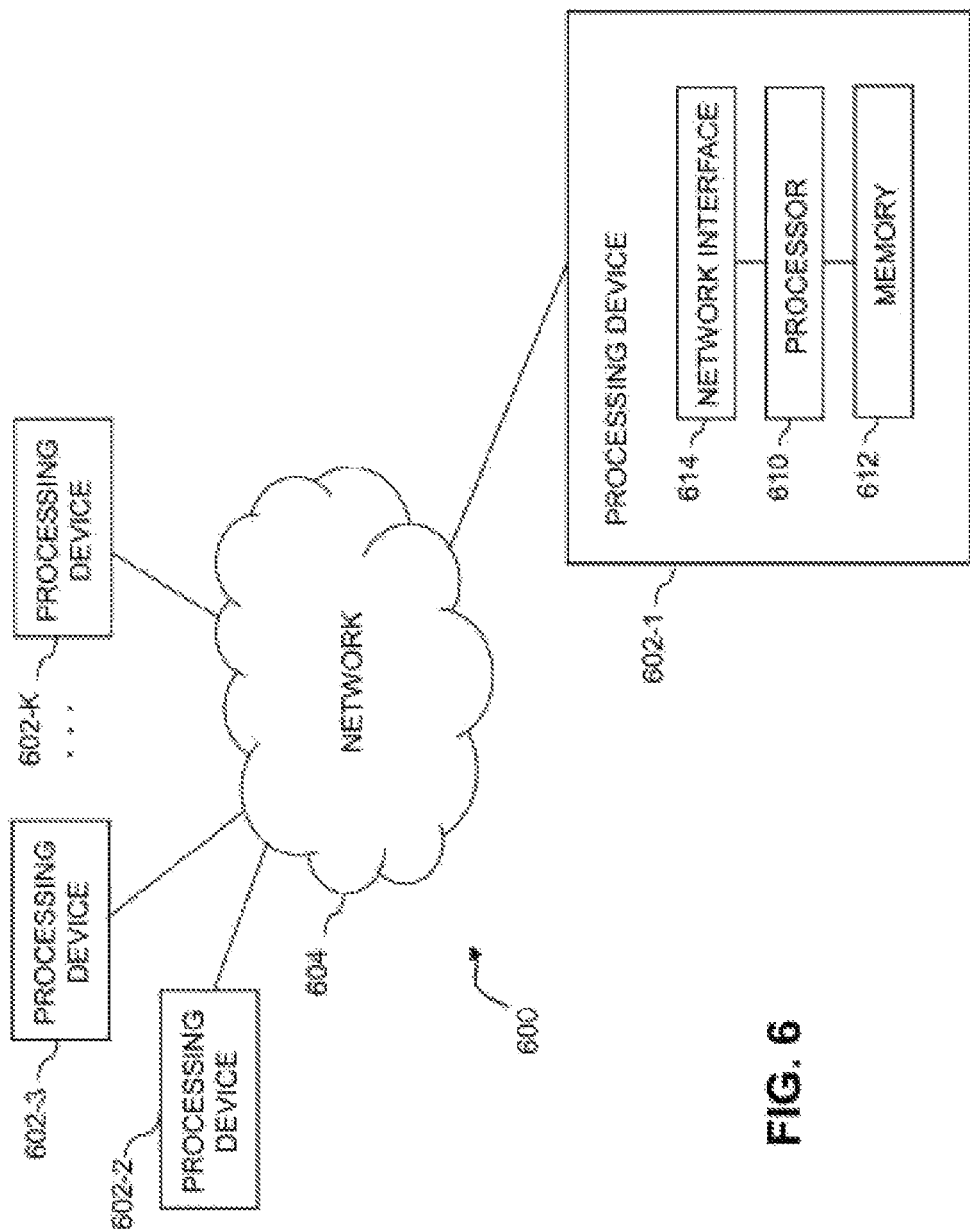
FIG. 6 depicts an alternative processing platform for implementing IO flow control in accordance with an embodiment.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide flow control functionality of the type described above for one or more processes running on a given one of the VMs. For example, each of the VMs can implement replication control logic and/or flow controllers for providing flow control functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems. In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide flow control functionality of the type described above. For example, a container host device supporting multiple containers of one or more container sets can implement one or more instances of replication control logic and/or flow controllers for providing flow control functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the flow control functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication processes, flow controllers and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for performing input/output (IO) flow control in a storage system, the method comprising:
  receiving an IO latency factor for each IO of a plurality of IOs in a workload, the IO latency factor specifying a priority level;
  receiving a component latency factor, with respect to each of the Ios in the workload, for each component of a plurality of components in the storage system, the component latency factor indicating a degree to which the component is considered in assessing the workload;
  processing the plurality of IOs in the workload, comprising:
    applying, during processing of the workload, the IO latency factor and the component latency factor to each of the IOs in the workload; and
    determining an effective average latency of the plurality of IOs in the workload as a function of the applied IO latency factors and the applied component latency factors; and
  modifying the IO flow control of incoming IOs in the storage system as a function of the effective average latency.

2. The method of claim 1, wherein modifying the IO flow control of the incoming IOs includes increasing an amount of the incoming IOs when the effective average latency is less than a threshold value.

3. The method of claim 1, wherein applying the IO latency factor and the component latency factor to each of the corresponding IOs includes:
  for each component of the plurality of components that processes the IO as determined by the component latency factor:
    determining an amount of processing time attributed to the IO;
    multiplying the amount of processing time by the component latency factor, yielding a component latency value;
    summing component latency values for each of the components; and
    multiplying the sum of the component latency values by the IO latency value, yielding an effective IO latency value attributed to the IO, the effective IO latency value specifying a load indicator.

4. The method of claim 3, further comprising calculating a current average latency of the IOs processed in the workload comprising calculating effective IO latency values for each of the IOs processed in the workload, taking an average of the effective IO latency values.

5. The method of claim 4, wherein determining the effective average latency includes trending the current average latency calculated for the IOs processed in the workload and a previous average latency calculated for IOs processed in a previous workload.

6. The method of claim 1, wherein the IO latency factor is a value between 0 and 1, and the component latency factor is a value between 0 and 1.

7. The method of claim 1, wherein the component latency factor measures an amount of time the IO is processed through a corresponding one of the components, and wherein the components subject to the component latency factor include at least one of:
  synchronous replication remote data transfer functions; and
  address lock resolution functions.

8. A system for performing input/output (IO) flow control in a storage system, the system comprising:
  a memory comprising computer-executable instructions; and
  a processor operable by a storage system, the processor executing the computer-executable instructions, the computer-executable instructions when executed by the processor cause the processor to perform operations comprising:
    receiving an IO latency factor for each IO of a plurality of IOs in a workload, the IO latency factor specifying a priority level;
    receiving a component latency factor, with respect to each of the IOs in the workload, for each component of a plurality of components in the storage system, the component latency factor indicating a degree to which the component is considered in assessing the workload;
    processing the plurality of IOs in the workload, comprising:
      applying, during processing of the workload, the IO latency factor and the component latency factor to each of the IOs in the workload; and
      determining an effective average latency of the plurality of IOs in the workload as a function of the applied IO latency factors and the applied component latency factors; and modifying the IO flow control of incoming IOs in the storage system as a function of the effective average latency.

9. The system of claim 8, wherein modifying the IO flow control of the incoming IOs includes increasing an amount of the incoming IOs when the effective average latency is less than a threshold value.

10. The system of claim 8, wherein applying the IO latency factor and the component latency factor to each of the corresponding IOs includes:
for each component of the plurality of components that processes the IO as determined by the component latency factor:
determining an amount of processing time attributed to the IO;
multiplying the amount of processing time by the component latency factor, yielding a component latency value;
summing component latency values for each of the components; and
multiplying the sum of the component latency values by the IO latency value, yielding an effective IO latency value attributed to the IO, the effective IO latency value specifying a load indicator.

11. The system of claim 10, wherein the operations further comprise calculating a current average latency of the IOs processed in the workload comprising calculating effective IO latency values for each of the IOs processed in the workload, taking an average of the effective IO latency values.

12. The system of claim 11, wherein determining the effective average latency includes trending the current average latency calculated for the IOs processed in the workload and a previous average latency calculated for IOs processed in a previous workload.

13. The system of claim 8, wherein the IO latency factor is a value between 0 and 1, and the component latency factor is a value between 0 and 1.

14. The system of claim 8, wherein the component latency factor measures an amount of time the IO is processed through a corresponding one of the components, and wherein the components subject to the component latency factor include at least one of:
synchronous replication remote data transfer functions; and
address lock resolution functions.

15. A computer program product performing input/output (IO) flow control in a storage system, the computer program product embodied on a non-transitory computer readable medium, the computer program product including instructions that, when executed by a computer, causes the computer to perform operations comprising:
receiving an IO latency factor for each IO of a plurality of IOs in a workload, the IO latency factor specifying a priority level;
receiving a component latency factor, with respect to each of the IOs in the workload, for each component of a plurality of components in the storage system, the component latency factor indicating a degree to which the component is considered in assessing the workload;
processing the plurality of IOs in the workload, comprising:
applying, during processing of the workload, the IO latency factor and the component latency factor to each of the IOs in the workload; and
determining an effective average latency of the plurality of IOs in the workload as a function of the applied IO latency factors and the applied component latency factors; and
modifying the IO flow control of incoming IOs in the storage system as a function of the effective average latency.

16. The computer program product of claim 15, wherein modifying the IO flow control of the incoming IOs includes increasing an amount of the incoming IOs when the effective average latency is less than a threshold value.

17. The computer program product of claim 16, wherein applying the IO latency factor and the component latency factor to each of the corresponding IOs includes:
for each component of the plurality of components that processes the IO as determined by the component latency factor:
determining an amount of processing time attributed to the IO;
multiplying the amount of processing time by the component latency factor, yielding a component latency value;
summing component latency values for each of the components; and
multiplying the sum of the component latency values by the IO latency value, yielding an effective IO latency value attributed to the IO, the effective IO latency value specifying a load indicator.

18. The computer program product of claim 17, wherein the operations further comprise calculating a current average latency of the IOs processed in the workload comprising calculating effective IO latency values for each of the IOs processed in the workload, taking an average of the effective IO latency values.

19. The computer program product of claim 18, wherein determining the effective average latency includes trending the current average latency calculated for the IOs processed in the workload and a previous average latency calculated for IOs processed in a previous workload.

20. The computer program product of claim 15, wherein:
the IO latency factor is a value between 0 and 1, and the component latency factor is a value between 0 and 1;
the component latency factor measures an amount of time the IO is processed through a corresponding one of the components; and
the components subject to the component latency factor include at least one of:
synchronous replication remote data transfer functions; and
address lock resolution functions.

* * * * *